July 10, 1945.  A. W. MEYER  2,379,978
RUBBER COVERED COPPER ARTICLE
Filed June 12, 1941
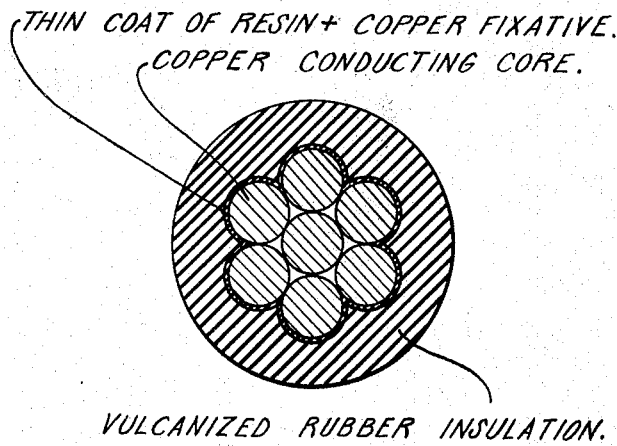
THIN COAT OF RESIN + COPPER FIXATIVE.
COPPER CONDUCTING CORE.
VULCANIZED RUBBER INSULATION.
INVENTOR.
ALBERT W. MEYER
BY
ATTORNEY Patented July 10, 1945

2,379,978

UNITED STATES PATENT OFFICE 2,379,978

RUBBER COVERED COPPER ARTICLE

Albert W. Meyer, Nutley, N. J., assignor to United States Rubber Company, New York, N. Y., a corporation of New Jersey Application June 12, 1941, Serial No. 397,820

7 Claims. (Cl. 117—75)

This invention relates to rubber covered copper articles, and more particularly latex-rubber insulated electrical conductors having a metallic copper conducting core whereby to inhibit or prevent the discoloration of the rubber by the copper.

While the invention is not limited to wire, it is particularly important in that field. Rubber insulation on copper wire rapidly decreases in tensile strength and other physical properties, and in the case of light colored stock, the rubber insulation is soon darkened. The copper has a harmful effect on rubber; it causes reduction in tensile strength, modulus, and abrasion resistance, and eventually may produce a sticky mass. Tinning of the copper before the rubber covering is applied reduces the harmful effects but is not completely effective since the copper can migrate through the tin into the rubber. Also, the harmful effects of the copper on the rubber may be decreased by incorporating in the rubber certain chemicals called copper fixatives such as N,N′-diphenyl p-phenylene diamine, N,N′di$\beta$-naphthyl p-phenylene diamine, disalicylal ethylene diamine, disalicylal diethylene triamine, reaction products of salicylaldehyde and polyethylene polyamine mixtures, salicylal triethylene tetramine, sym-ethylene bis-$\alpha$amino isobutyronitrile, sym-ethylene bis-$\alpha$amino isobutyric acid, 8-hydroxy quinoline, and p-(p-toluene sulfonylamino)-phenyl tolylamine, etc. Even this known procedure does not give the desired protection against copper.

According to the present invention, the copper wire or tinned copper wire is coated with a synthetic resin composition containing the copper fixative. The copper fixative employed may be any of those known to the art such as those mentioned above. The rubber insulation is then applied over the resin coating. The accompanying drawing shows this relationship. The resin coating containing the fixative prevents deterioration of the rubber by posing as a barrier between the rubber and the copper.

The following example is given to illustrate the invention, the parts being by weight:

EXAMPLE I

A #14 tinned copper wire was coated with a thin film of resin by passing it through a resin emulsion prepared as follows:

Composition A

| | Parts by weight |
|---|---|
| Disalicylal ethylene diamine | 5.7 |
| Water | 990 |
| Concentrated ammonia | 10 |
| Dimethylamine oleate | 40 |

This mixture was made up warm to assist in the emulsification of the disalicylal ethylene diamine.

Composition B

| | Parts by weight |
|---|---|
| Water | 1866 |
| Concentrated ammonia | 19 |
| Dimethylamine oleate | 35 |
| [1] RHoplex Resin WC9 | 3938 |
| [2] RHoplex Resin WD10 | 675 |

[1] 25% aqueous emulsion of 90% methyl acrylate—10% ethyl acrylate copolymer.
[2] 25% aqueous emulsion of ethyl acrylate polymer.

The resin emulsion, which is a mixture of Compositions A and B in the proportions indicated, and thus contains 0.5% of copper fixative based on the weight of the resin solids, was put in the first tank of a latex wire dipping machine. Tinned copper wire was passed through the resin solution, was dried at an average temperature of 219° F., and was then repeatedly coated with latex and dried, until six latex dips had been applied. Then the coated wire was cured in saturated steam for 2 mins. at 330° F. The rubber-covered copper wire having an intermediate coating of resin and copper fixative, applied as described above, and a rubber-covered wire without the intermediate resin coating were aged for 2 weeks in a Geer oven at 158° F., together with a third rubber-covered wire having an intermediate resin coating containing no anti-copper chemical. The copper contents of the rubber from the aged samples were as follows:

| Barrier coating | Grams copper/100 grams rubber | Grams copper in rubber/sq. in. wire | Percent reduction in copper migration |
|---|---|---|---|
| (1) None | .064 | .000244 | |
| (2) Resin only | .015 | .000055 | 77 |
| (3) Resin + disalicylal ethylene diamine | .008 | .000032 | 87 |

Tensile strength tests were also made on these samples with the following results:

| Original tensil strength | Tensil strength after 2 weeks in Geer oven | Percent depreciation in tensile | Tensile strength after 18 days in Geer oven | Percent depreciation in tensile |
|---|---|---|---|---|
| (1) 4,630 | 3765 | 18.7 | 3,275 | 29.2 |
| (2) 4,540 | 3935 | 13.3 | 3,475 | 23.5 |
| (3) 4,010 | 3850 | 4.0 | 3,305 | 17.5 |

The samples after Geer aging also showed the effect of the resin, with or without the anti-copper chemical, in preventing discoloration of the rubber by copper. The rubber insulation of the blank had many black spots, whereas the rubber insulation of wires having a resin coating were practically untarnished. The rubber insulation of the blank also stuck to the copper while the rubber insulations of the resin coated samples were free-stripping. Latex-insulated tinned copper wire shows evidence of black spots in the rubber after 3 to 4 weeks aging under atmospheric conditions; similar wire which was coated with the resin emulsion prevents the formation of black spots for 6 months, or more. After 11 months, the rubber insulation of resin-treated wire has a few black spots, but these are not very prominent and do not impair the appearance or usefulness of the wire; the rubber insulation of untreated wire is badly discolored by black spots.

Instead of resin emulsions, resin solutions in water or inorganic solvents, or molten resin, may be used. Resins which have been useful in practicing the invention are: acrylic esters, methacrylic esters, methyl cellulose, phenol-modified alkyd, alkyd, heat-hardenable phenol-formaldehyde, urea-formaldehyde, alkyd-modified urea-formaldehyde, polyvinylalcohol. The resin may be applied either by dipping, or by spraying, brushing, or any other convenient method.

The following table gives data on other resin coatings containing Example I copper fixative in the same concentration as in Example I:

| Resin coating | Gms. copper/100 gms. rubber | Gms. copper in rubber/ 1,000 feet of wire | Percent reduction copper migration |
| --- | --- | --- | --- |
| None | 0.154 | 1.848 | |
| Soft acrylic ester resin | .003 | 0.042 | 98 |
| Urea-formaldehyde (plasticized) | .011 | 0.166 | 93 |
| Polyvinylalcohol | .003 | 0.041 | 98 |
| None | .202 | 1.670 | |
| Hard acrylic ester resin | .016 | 0.136 | 92 |

By the method described, it is possible to reduce the amount of anti-copper chemical required for the protection of a rubber-covered conductor. Thus, in Example I cited above an extremely thin coating represented by .00071 lb. of disalicylal ethylene diamine per 1000 feet of wire was used, or .036% on the rubber for wire covered with 0.9 gm. rubber per ft. of wire, whereas for protection of the rubber against copper by incorporating the chemical in the rubber, .1 to 2% would be required, or 3 to 6 times as much as used in the present invention, and the degree of protection against copper is much less than by the present procedure.

Preferred resins are those which will preserve film continuity at elevated temperatures, such as 220° F. and above.

The inhibition of copper migration by the resin coating depends on the resin molecule having low adsorptive attraction to copper and not reacting chemically to form an unstable molecular complex.

Plasticizers may be incorporated in the resin composition when necessary in order to give it a desired degree of flexibility, since it is desirable that the resin coating be substantially continuous and flexible as would be needed by a copper wire.

Having thus described my invention, what I claim and desire to protect by Letters Patent is:

1. A composite rubber-covered copper article in which a highly effective barrier consisting of a substantially continuous flexible resin coating containing in addition to the resin an organic amine copper fixative is interposed between the rubber and the copper.

2. A rubber insulated electrical conductor having a metallic copper conducting core, which core carries a substantially continuous flexible resin coating containing in addition to the resin an organic amine copper fixative as a highly effective shield between the conducting core and the rubber sheathing whereby to prevent discoloration of the rubber by the copper.

3. A latex-rubber insulated electrical conductor having a metallic copper conducting core, which core carries a substantially continuous flexible resin coating containing in addition to the resin an organic amine copper fixative as a highly effective shield between the conducting core and the rubber sheathing whereby to prevent discoloration of the rubber by the copper.

4. A rubber insulated electrical conductor having a metallic copper conducting core, which core carries a substantially continuous flexible acrylic ester resin coating containing in addition to the resin an organic amine copper fixative as a highly effective shield between the conducting core and the rubber sheathing whereby to prevent discoloration of the rubber by the copper.

5. A latex-rubber insulated electrical conductor having a metallic copper conducting core, which core carries a substantially continuous flexible resin coating containing disalicylal ethylene diamine as a shield between the conducting core and the rubber sheathing whereby to prevent discoloration of the rubber by the copper.

6. A rubber-insulated electrical conductor having a conducting core of copper, a covering of rubber composition of sufficient thickness to provide an electrically insulating layer, and a highly effective shield to prevent copper migration between the core and the rubber, said shield comprising a substantially continuous flexible resin layer containing an organic amine copper fixative, the resin layer being so thin as to have no substantial electrical insulating properties.

7. A rubber-insulated electrical conductor having a conducting core of copper, a covering of rubber composition of sufficient thickness to provide an electrically insulating layer, said covering being substantially identical with the dried-in-situ deposit of liquid rubber latex, and a highly effective shield to prevent copper migration between the core and the rubber, said shield comprising a substantially continuous flexible resin layer containing an organic amine copper fixative, the resin layer being so thin as to have no substantial electrical insulating properties.

ALBERT W. MEYER.